(12) United States Patent
Inbar et al.

(10) Patent No.: US 6,309,074 B1
(45) Date of Patent: Oct. 30, 2001

(54) BACKPROJECTION TRANSPARENCY VIEWER

(75) Inventors: Dan Inbar; Eran Shaffir, both of Haifa (IL)

(73) Assignee: SmartLight Ltd., Yokneam-Elit (IL)

(*) Notice: Subject to any disclaimer, the term of this patent is extended or adjusted under 35 U.S.C. 154(b) by 0 days.

(21) Appl. No.: 08/981,106
(22) PCT Filed: Jun. 20, 1996
(86) PCT No.: PCT/IL96/00026
  § 371 Date: Dec. 17, 1997
  § 102(e) Date: Dec. 17, 1997
(87) PCT Pub. No.: WO97/01127
  PCT Pub. Date: Jan. 9, 1997

(30) Foreign Application Priority Data

Jun. 21, 1995 (IL) ............................................. 114258
Aug. 11, 1995 (IL) ............................................. 114911

(51) Int. Cl.[7] ............................................. G03B 21/14
(52) U.S. Cl. ............................... 353/120; 353/74; 40/361
(58) Field of Search ................... 353/28, 97, 95, 353/96, 102, 120, 74; 362/33, 97; 40/361, 442

(56) References Cited

U.S. PATENT DOCUMENTS

| | | |
|---|---|---|
| 1,988,654 | 1/1935 | Haag . |
| 2,436,162 | 2/1948 | Cadenas . |
| 3,881,809 * | 5/1975 | Fergason et al. . |
| 4,004,360 | 1/1977 | Hammond . |
| 4,330,813 * | 5/1982 | Deutsch ................................ 362/244 |
| 4,373,280 | 2/1983 | Armfield . |
| 4,510,708 | 4/1985 | Pokrinchak . |
| 4,637,150 | 1/1987 | Geluk . |
| 4,908,876 | 3/1990 | Deforest et al. . |
| 5,153,386 * | 10/1992 | Siefer et al. ........................... 362/97 |
| 5,313,726 | 5/1994 | Yaniv et al. . |
| 5,430,964 | 7/1995 | Inbar et al. . |
| 5,491,332 | 2/1996 | Inbar et al. . |
| 5,835,173 * | 11/1998 | Inbar et al. ........................... 349/61 |
| 5,836,096 * | 11/1998 | Brauer .................................. 353/38 |
| 5,859,676 * | 1/1999 | Inbar et al. ............................ 349/5 |
| 5,913,591 * | 6/1999 | Melville ................................ 353/28 |

FOREIGN PATENT DOCUMENTS

96/17269  6/1996 (WO) .

OTHER PUBLICATIONS

"A Polarization Transforming Optics for High Luminance LCD Projector", by S. Shikama, E. Toide and M. Kondo, Proceedings of EURODISPLAY '90, the tenth international display research conference 1990.

"Polarization Conversion System LCD Projection", by A.J.S.M. De Vaan, A.H.J. Van De Brandt, R.A.M. Karsmakers, W.A.G. Timmers, in the conference proceedings of EURODISPLAY '93, the 13th international display research conference.

* cited by examiner

*Primary Examiner*—William Dowling
(74) *Attorney, Agent, or Firm*—Fenster & Company Patent Attorneys, Ltd.

(57) ABSTRACT

A method of transparency viewing, including: placing a transparency at a viewing surface, forming a light pattern and projecting the light pattern to back-illuminate the transparency. Preferably, the light pattern is formed by spatially modulating a beam of light using a plurality of light valves.

48 Claims, 8 Drawing Sheets

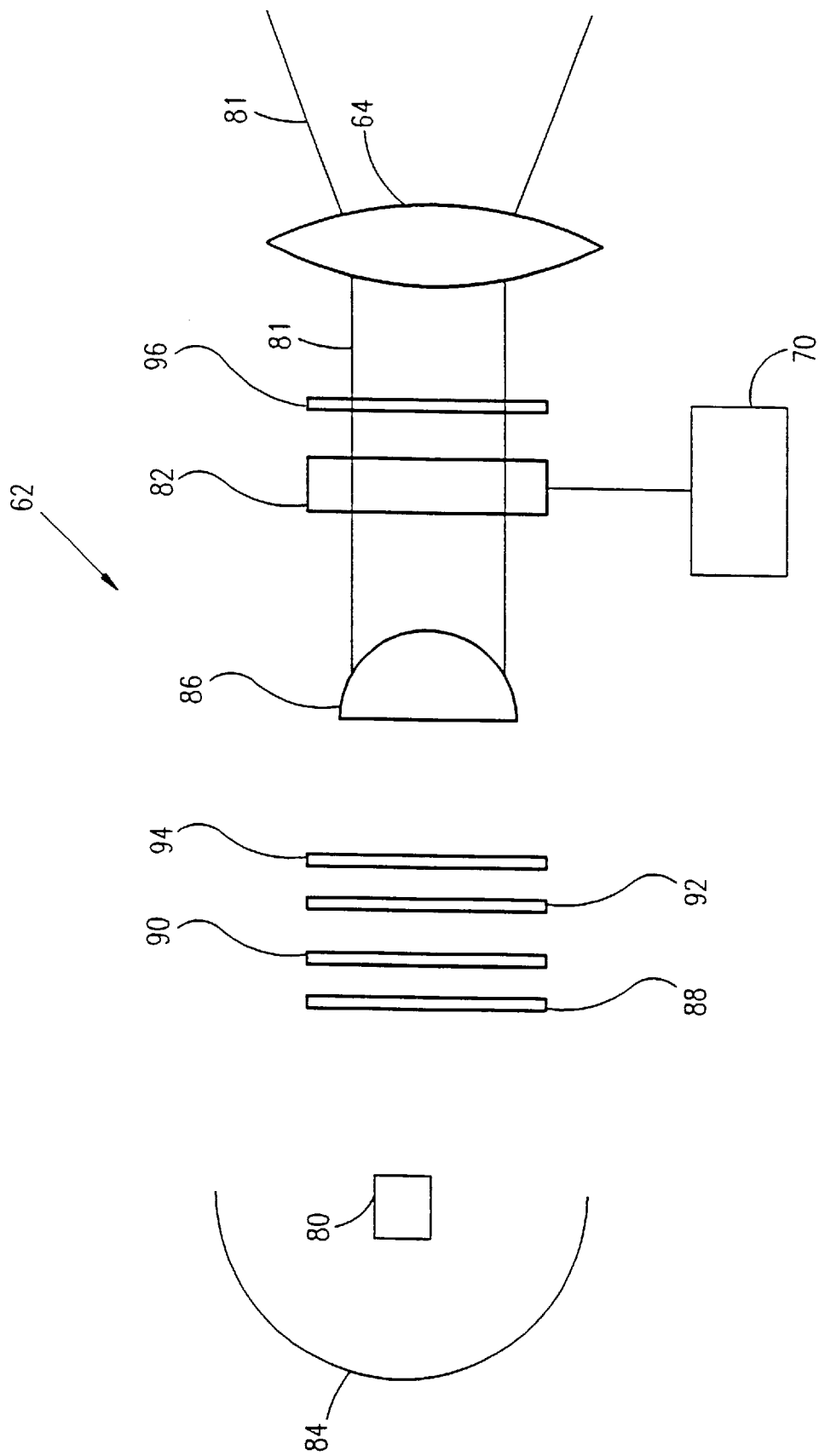

BACKPROJECTION TRANSPARENCY VIEWER

RELATED APPLICATIONS

The present application is a US application of PCT/IL96/00026, filed Jun. 20, 1996.

FIELD OF THE INVENTION

The present invention relates generally to a transparency viewing device and, more particularly, to apparatus for back-illuminating X-ray transparencies using a projector.

BACKGROUND OF THE INVENTION

Medical X-ray transparencies are usually examined by placing them over the viewing surface of a device commonly referred to as an illuminator, light-box or viewbox. Conventional illuminators normally comprise a box-like structure enclosing a plurality of fluorescent or incandescent lighting tubes behind a light diffusing plate which defines the display area. Generally, transparencies are retained on the surface of the viewing surface by pushing the upper edge of the transparencies under spring-loaded film-holder clips located along the top edge of the viewing surface.

Standard size illuminators have a viewing surface 17 inches high and 14 inches or multiples of 14 inches (i.e. 28 inches or 56 inches) wide. Usually, each 14 inch width of viewing surface has its own fluorescent tubes and control switch. Such viewing surface enables the viewing of standard size X-ray films which measure up to 17 inches by 14 inches.

The sections of the viewing surface not covered by transparencies need not be illuminated. This eliminates unnecessary glare from areas outside the transparency. When transparencies smaller than 14 inches by 17 inches are to be examined, they are typically retained on the display area in the same manner as full size transparencies, for example, by suspending them by means of the film-holders along the top of the viewer. This leaves a portion of the display area surrounding the transparencies fully illuminated, with the resulting glare detracting from the visual perception of the person trying to study the transparency and assess the information it contains.

Often transparencies contain several very transparent areas, and, frequently, radiologists have to examine transparencies which over-exposed (i.e., very dark) in some portions and under-exposed (i.e., very light) in others. In these cases, considerable glare emanates through areas of the transparencies themselves. Moreover, in many instances, the region of the display area which is of highest interest to the viewer is quite dense. Thus, the ability to discern details in the region may be limited by glare from the surrounding less dense areas.

Attempts have been made in the past to provide viewing devices for X-ray transparencies which shield the eyes of the observer from light other than that passing through the transparencies. These viewing devices obscure light from portions of the transparencies not of interest or from outside the transparencies and/or reduce the contrast within transparencies.

U.S. Pat. No. 1,988,654 to Haag discloses a light box which incorporates two manually movable curtains for masking all of the light-transmitting surfaces of a diffuser up to the edges of a transparency.

U.S. Pat. No. 2,436,162 to Cadenas discloses an X-ray viewer having a masking arrangement incorporating a plurality of hinge—connected opaque masks which may be manually pivoted relative to each other to expose all or only selected parts of an X-ray transparency.

U.S. Pat. No. 4,004,360 to Hammond is directed to a self-masking viewing device which purports to automatically obscure areas of the viewing screen not occupied by the X-ray transparency. In the disclosed device, the screen is provided with a multiplicity of holes which may be selectively blocked by shutters or opened for the passage of light. The interior of the device is connected to a vacuum source which functions to hold the film against the front surface of the device.

The vacuum functions, in addition, to close the shutters connected with those holes not covered by the transparencies, so that passage of light through such holes is prevented. Air cannot pass through those holes in registry with the transparencies and, thus, the shutters associated with the covered holes remain open for the passage of light. The device described is unsuitable for critical inspection of X-ray transparencies since the presence of holes and shutters in the areas in registry with the transparencies creates a pattern behind the transparencies which interferes with the ability to accurately read them.

U.S. Pat. No. 4,373,280 to Armfield discloses an X-ray viewing plate having a cross bar for supporting transparencies at a central portion of the screen. A series of shades is provided which may be manually activated to obscure selected parts of the illuminated surface.

U.S. Pat. No. 4,510,708 to Porkinchak discloses an X-ray viewing device which includes a series of masks on an elongated scroll. In a specific embodiment of the invention, the scroll is moved by a motor on a pair of feed rolls. The masks are sized to correspond with stock sizes of X-ray transparencies. The apparatus has a dimensional sensing mechanism which aligns a selected mask with a positioned transparency automatically in accordance with the sensed dimension. The transparencies are inserted into a film-holder. The widthwise sensing function is performed by a series of levers or fingers positioned to engage an edge of the film.

U.S. Pat. No. 4,637,150 to Geluk describes a system in which a cathode ray tube (CRT) is used as a light source and the light emitted by this source is modulated in accordance with the stored density of a transparency. This system is impractical due to the limited sizes and associated light intensity outputs of CRTs for this type of illuminator.

U.S. Pat. No. 4,908,876 to Deforest et al., describes, inter alia, a transparency viewer using projection lens to project a light source for backilluminating a transparency.

U.S. Pat. No. 5,313,726 to Yaniv et al., describes a transparency viewer in which a light source, mounted in a reflecting housing, is used to back-illuminate a transparency.

German Patent Application DE 33 31 762 A1 describes an array type electrochromatic illuminator in which back-lighting selectively illuminates portions of a viewing surface in response to the application of voltage to horizontal and vertical strip conductors on opposite faces of an electrochromatic material placed between the source of illumination and the viewing surface.

U.S. patent application Ser. No. 07/861,982, titled "Self Masking Transparency Viewing Apparatus" by Dan Inbar and Giora Teltsch, now U.S. Pat. No. 5,430,964, granted Jul. 11, 1995, and U.S. patent application Ser. No. 08/175,372, titled "Position Sensing Display Device" by Dan Inbar and Giora Teltsch, filed Mar. 31, 1994 and corresponding PCT Publications WO 91/10152, filed Dec. 28, 1990, and WO 93/01564, filed Jul. 11, 1991, the disclosures of which are incorporated herein by reference, disclose self-masking transparency viewing apparatus having a mask-pattern generating device which may be an electrically-controlled Liquid Crystal Array (LCA). In addition, there is provided a transparency detection means, such as optical sensors or micro switches. The optical sensors recognize optical properties, for example, attenuation of transparencies mounted and of unobstructed areas of the display area. In some embodiments the detection means determines the existence and locations of transparencies on the display surface, as well as the location of subimages within the transparencies. The detection data is transferred to a system control unit which drives the LCA to produce a complementary masking pattern in conformity with the displayed transparencies, masking other portions of the display area.

Back-illuminating a large LCA using direct illumination by a bank of fluorescent lamps, as shown in some prior art systems, has several drawbacks:

(a) the intensity of the back-illumination is typically limited to intensity levels in which the human eye is less sensitive to low-contrast details, due to limited area behind the display surface which is available for packing fluorescent lamps;

(b) at least two LCA layers are required to provide good contrast at acceptable viewing angles, since large LCAs typically have low contrasts (especially at large viewing angles); the plurality of LCAs reduces the intensity of the back-illumination still further;

(c) spatial uniformity is difficult to maintain when using a plurality of fluorescent lamps;

(d) producing large, high-contrast, LCAs, in particular STN (super twisted nematic) and PDLCA (polymer dispersed liquid crystal array), at acceptable yields and cost is difficult;

(e) producing very large LCAs, such as 14"×17" is not known in the art, thus, a plurality of LCAs must be used to cover a large display size, such as 14"×17", resulting in seams or dead spaces between the LCAs; seams are a drawback especially for horizontal mounting of large transparency sizes, such as 14"×17", on viewboxes optimized for vertical mounting of 14"×17" transparencies;

(f) large LCAs are very expensive;

(g) certain types of LCAs, such as active matrix, that allow high contrast and high complexity masking are unavailable in large sizes;

(h) cooling the LCAs in prior systems is difficult; and (i) light recycling is complex and inefficient in systems which use large LCAs.

Rear projection displays of images are well known. In particular, video monitors using an LCA projector are known. Generally, an LCA containing an image modulates an intense collimated light source to produce an image carrying beam. The image carrying beam is then projected, using a lens, onto the back of a display surface. Such a system is described in the lecture notes of "Projection Displays", a lecture given by Alan Sobel at Bally's hotel in Las Vegas, Nev., on May 14, 1990 for the Society For Information Display and in the lecture notes of "Electronic Projection Displays", a lecture given by Frederic J. Kahn at the Washington State Convention Center, Seattle, Wash. on May 17, 1993, the disclosures of both of which are incorporated herein by reference.

It is known in the art, that when modulating a light beam using an LCA, the light beam is attenuated to a significant degree. This attenuation is due to the fact that LCAs modulate linearly polarized light and transforming regular light into linearly polarized light usually involves a loss of intensity of 50% or more. Typically, the polarizer absorbs the non-transmitted light, resulting in significant heat generation and possible degradation of the polarizer or LC (liquid crystal) material. In recent year, several types of relatively low-loss linear polarizers has been developed.

FIG. 1A shows a first such polarizer, as described in "A Polarization Transforming Optics for High Luminance LCA Projector", by S. Shikama, E. Toide and M. Kondo, in the proceedings of EURODISPLAY '90, the tenth international display research conference, the disclosure of which is incorporated herein by reference. An unpolarized light beam 20 is split by a polarizing beam splitter 22 into a first polarized light beam 28 and a second polarized light beam 34 which have perpendicular polarization axes. Beam 34 is reflected by a mirror 24 to pass through a half-wave plate 26 which rotates the polarization axis of beam 34 by 90° to produce a beam 30. The polarization axes of beam 30 and beam 28 are parallel to each other and to the polarization axis of an input (to an LCA) polarizer 32. Thus, substantially all of the energy of light beam 20 passes through polarizer 32. Beam 30 is typically refracted to be parallel to beam 30 by additional optical elements (not shown).

FIG. 1B shows a second example of a low-loss polarizer, as described in "Polarization Conversion System LCD Projection", by A. J. S. M. De Vaan, A. H. J. Van De Brandt, R. A. M. Karsmakers, M. V. C. Stroomer and W. A. G. Timmers in the conference proceedings of EURODISPLAY '93, the 13th international display research conference, the disclosure of which is incorporated herein by reference. A polarizer 42 generally comprises a first prism portion 40 and a second prism portion 44 which are separated by thin birefringent layer 46, such as a birefringent adhesive. A light beam 48 entering prism 48 is refracted towards layer 46, which seoarates beam 48 into a first polarized beam 50, which is reflected back into prism 40, and into a second polarized beam 52, which is transmitted into prism 44. Beams 50 and 52 have perpendicular polarization axes. When beam 50 (and 52) exit prisms 40 (and 44), it is refracted back by an angle equal to its entrance angle. The polarization axis of beam 52 is rotated 90° by a half-wave plate 54 located on or near the exit of prism 44. Thus, beam 52 and beam 50 have parallel polarization axes.

SUMMARY OF THE INVENTION

In a preferred embodiment of the present invention, a display surface with a transparency thereon is back-illuminated with a projected pattern. The back-illumination is masked by a spatial modulator, preferably using an LCA, so that only portions of the display covered by the transparency or a region of interest thereof are back-illuminated. Preferably, the display surface is a partially diffusing screen.

Back-illuminating with a projected pattern, in accordance with the present invention, can afford several advantages. A first advantage is that the light intensity of the back-illumination is not significantly limited by the space behind the display surface. In a direct back-illumination system, the light intensity is limited by the number and size of lamps which can be placed behind the surface and by considerations of heat dissipation and spatial uniformity of the display surface. When back-illuminating with fluorescent lamps, the light intensities reached are usually sub-optimal. However, with a projector, high-temperature, high intensity light sources, such as metal-halide lamps can be used to generate any required amount of light. This light is then projected onto the display surface.

Cooling the light source and insulating the display surface (and transparencies and operators) from excess heat is simpler, in a preferred embodiment of the present invention, because the heat is emitted from a centralized location, which can be relatively far away from the display surface. In particular, cooling a small LCA is simpler and more efficient than cooling a large one.

Providing spatial uniformity when using direct lighting with multiple light sources is problematic. Each portion of the display surface is back-illuminated by a different light source and the relative intensities and color of these light sources changes as the light sources age. In projectors spatial uniformity is a much smaller problem, since the projector can mix the light from one or more light sources so that each location on the display surface receives substantially the same illumination. In particular, if only one light source is used, the spatial uniformity is stable over time.

Another advantage of embodiments of the present invention, relates to the type of at least some light sources used to back-illuminate the display surface. Typically fluorescent lamps are used in the prior art because they have relatively constant intensities over their length, are relatively efficient and are available in a wide range of colors spectrums, such as near-white and in spectrums which are pre-corrected for LCA absorption. In a projector, the variety of usable lamps is much wider. In particular, lamps which warm-up quickly, more efficient lamps and clusters of monochrome lamps are all suitable for the present invention. Furthermore, lamps which compensate for the spectral transmission spectrum of the LCAs may also be employed.

Other advantages of at least some embodiments of the present invention, relate to the LCA used for masking the transparency or region of interest. In a projector, a relatively small LCA can mask back-illumination for a very large screen. There are commercially available high contrast and high-resolution small LCAs, such as, "Super Twist Nematic" and active matrix types, which cannot be economically produced in the sizes required for a direct back-illumination viewbox for medical transparencies. As a result, fewer layers of LCAs are required to achieve the same contrast ratio between the bright and the dark portions of display surface. In particular, a single LCA may be sufficient for masking projected back-illumination for a transparency. since the back-illumination is less attenuated by LCA layers, lower source intensities are required, and less heat is dissipated.

Another advantage relating to small, high contrast and high resolution LCAs is the possibility of generating more complex masking patterns than those described in PCT publication WO95/14949, titled "Transparency Viewing Device Comprising Passive Matrix LCD", by Dan Inbar, Hanan Wolf and Ben Zion Levy, published Jun. 1, 1995, PCT application publication WO95/14950, titled "Viewing Apparatus and Work Station", by Dan Inbar and Hanan Wolf, published Jun. 1, 1995 and U.S. application Ser. No. 08/348,958, titled "Improved Display Device", to Dan Inbar, Giora Teltsch, Ben Zion Levy and Eran Shaffir, filed Nov. 28, 1994. Yet another advantage relating to small, high resolution and high contrast LCAs is the possibility of generating gray-level masking without compromising the overall contrast-ratio of the LCA, as in some prior art systems.

Use of a projected cone beam to illuminate the transparency reduces contrast-degradation for off-axis viewing as compared to the prior art, especially if the transparency is mounted on a partially diffusing surface.

A further advantage is that a more uniform masking pattern is achieved than that of some prior art systems. The relatively long distance between the LCAs and the display surface, together with the small aberrations typically found in the projectors result in a diffusion effect. Patterns arising from non-active portions of the LCAs are erased by the diffusion effect, without the use of a diffuser. Alternatively or additionally, the projector is calibrated to be out of focus, while retaining a sufficient spatial resolution, such as 3–10 mm. As a result, transparencies can be viewed through a relatively wide viewing angle with a uniformly high contrast masking pattern.

Another advantage of the present invention is that the size of the LCA is not a limiting factor in providing a "seam-free" display area. In prior art systems for 14"×17" displays a number of LCAs were required to cover the display surface. The seams or dead spaces between such LCAs had to be compensated for.

The system of the present invention is less expensive than those of the prior art, due, inter alia, to the use of smaller LCAs and fewer lamps. Furthermore, it is very practical to recycle light from masked areas when the masking system is small.

There is thus provided in accordance with a preferred embodiment of the present invention a method of transparency viewing including, placing the transparency at a viewing surface and back-illuminating the transparency with a projected light source.

In a preferred embodiment of the present invention, back-illuminating includes projecting a masking pattern toward the viewing surface. Preferably, the masking light pattern is formed by spatially modulating a beam of light using a plurality of light-valves. Preferably, a second plurality of light-valves also spatially modulates the beam of light. In a preferred embodiment of the present invention, the masking pattern includes dark portions and bright portions and spatial modulating includes redirecting at least a portion of the beam of light from dark portions of the pattern to bright portions of the pattern. Preferably, redirecting includes scattering a portion of the beam from the plurality of light-valves and redirecting the scattered portion back toward the light-valve.

Additionally or alternatively, modulating includes reflecting a portion of the beam of light from the dark portions of the pattern toward a third location and reflecting at least some of the portion of the beam of light from the third location toward the plurality of light-valves.

In a preferred embodiment of the invention, spatially modulating includes spatially modulating the beam of light to correct for intensity variations caused by the projection.

Preferably, spatially modulating includes converting the polarization of the beam of light using a low-loss polarizer.

In a preferred embodiment of the invention, the beam of light is spatially modulated by reflecting it off a plurality of reflectance type light-valves. Additionally or alternatively, the beam of light is spatially modulated using an LCA.

Preferably, each of the plurality of light-valves is driven in an independent manner.

Preferably, the projection includes projecting the pattern onto the viewing surface out-of-focus.

There is also provided with accordance to another preferred embodiment of the present invention a viewbox, including, a display surface adapted for mounting a transparency thereon and a projector which back-illuminates the display surface with projected light. Preferably, the display surface is diffusing. Preferably, the viewbox includes a face light-valve located adjacent the display surface.

In a preferred embodiment of the present invention, the projected light is patterned. Preferably, the projector includes a plurality of light-valves which pattern the projected light. Further preferably, the viewbox includes a second plurality of light-valves, arranged in tandem with the plurality of light valves in the projector. Alternatively, the projected light is substantially homogeneous.

In a further preferred embodiment, the light pattern includes dark portions and bright portions and the viewbox including a light recycling apparatus which blocks light from passing through the plurality of light-valves at locations corresponding to the dark portions and redirects the blocked light to portions of the plurality of light-valves which correspond to the bright portions. Preferably, the light recycling apparatus includes light reflecting shutters selectably positionable adjacent the plurality so light-valves.

Additionally or alternatively, the plurality of light-valves in the projector backscatter light. Preferably, the viewbox includes means for redirecting light scattered by the plurality of light-valves back toward the plurality of light-valves. Alternatively or additionally, the viewbox includes a reflecting surface which redirects light scattered by the plurality of light-valves back toward the plurality of light-valves. 37. Preferably, the viewbox includes means for recycling light.

Preferably, the projector further includes a collimator adjacent the plurality of light-valves, which collimates the light exiting the light-valves.

In a preferred embodiment of the invention, the projector further includes a light source and an infra red filter situated between the light source and the plurality softlight-valves comprised in the projector.

Preferably, the plurality of light-valves includes a liquid crystal a-ray (LCA), preferably, a super twisted nematic LCA or a polymeric dispersion liquid crystal array. Preferably, the LCA includes an active matrix LCA. Additionally or alternatively, the plurality of light-valves includes a plurality of reflectance type light-valves, preferably, a digital micro-mirror device.

Preferably, the plurality of light-valves include a low-loss polarizer, preferably, a retro-reflector sheet polarizer, which polarizes light entering the plurality of light-valves. Preferably, the viewbox includes a second polarizer for polarizing light entering the plurality of light-valves.

In a preferred embodiment of the invention, the projector includes a mechanical shutter system which modulates the back-illumination.

Preferably, the viewbox includes a neutral density filter which corrects intensity non-uniformities on the display surface. Additionally or alternatively, the viewbox Preferably includes a chromatic filter which adjusts the color spectrum of the light back-illuminating the transparency.

In a preferred embodiment of the invention, the viewbox includes a mirror which reflects the light beam towards the display surface.

In another preferred embodiment of the invention, the viewbox includes a camera which views the display surface. Preferably, the camera is located on the inside of the viewbox.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention.

FIG. 3 is a schematic side view of a projection subsystem of a viewbox according to a preferred embodiment of the invention, such as can be used in the embodiment of FIG. 2;

DESCRIPTION OF THE PREFERRED EMBODIMENTS OF THE INVENTION

Figure 2:
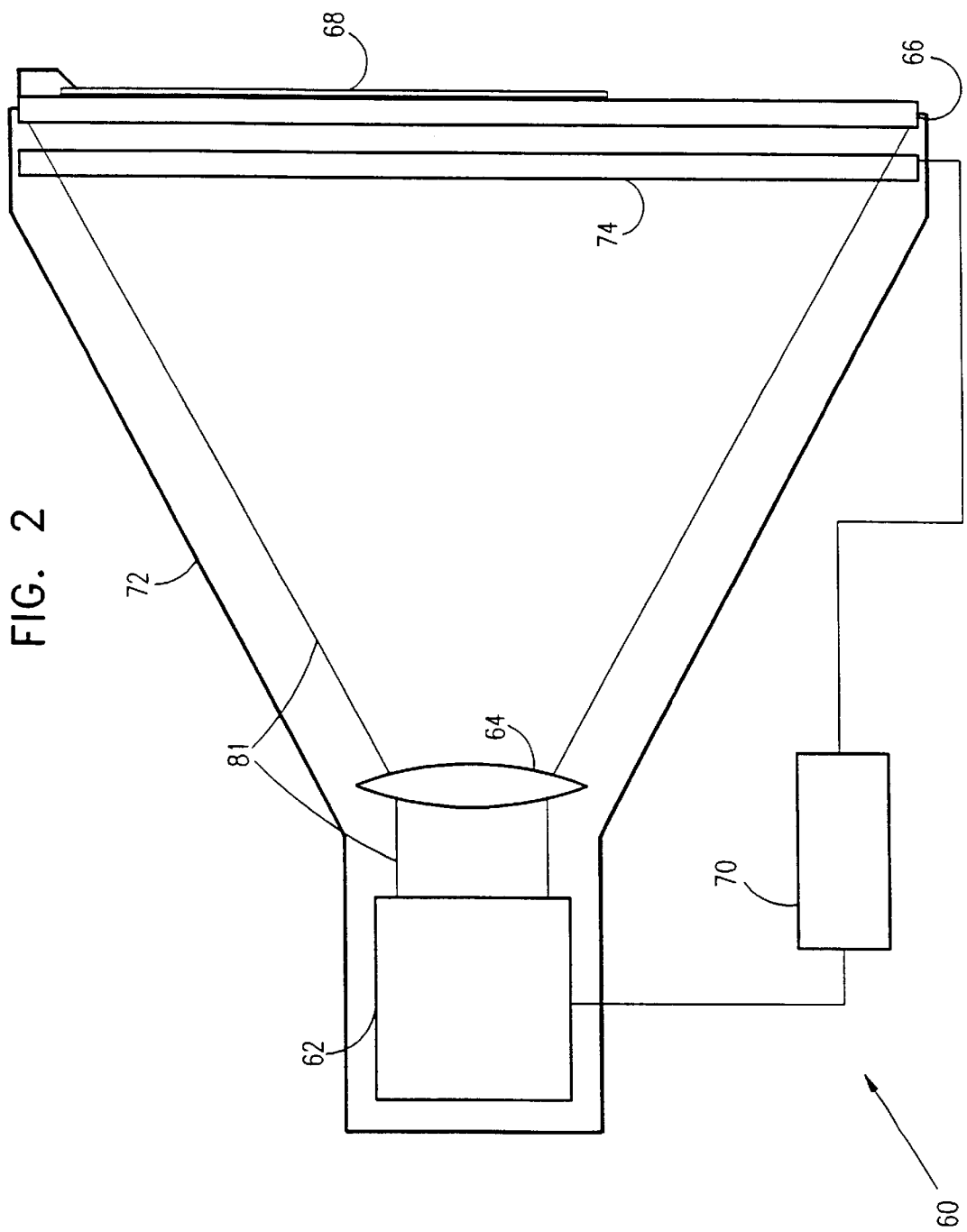
FIG. 2 is a schematic side view of a viewbox according to one preferred embodiment of the present invention.

FIG. 2 is a schematic side view of a viewbox 60 according to a preferred embodiment of the present invention. Viewbox 60 generally comprises a projection subsystem 62 which uses projection optics 64 to project a patterned light beam 81 onto the back of a display surface 66. Display surface 66 preferably comprises a diffuser. A transparency 68, which is mounted on display surface 66, is back-illuminated by patterned light 81. The pattern of patterned light 81 is preferably controlled by a controller 70 to back-illuminate only portions of display surface 66 which are covered by transparency 68 or regions of interest thereon. Thus, an operator viewing transparency 68 is not dazzled by light from other parts of the display surface. Optionally, an LCA 74, also controlled by controller 70, is used to further modulate the pattern of light beam 81 before light 81 reaches display surface 66 to enhance the contrast of the pattern in light beam 81. Preferably, patterned light 81 is formed by masking a beam of light using an LCA within projection subsystem 62. Some preferred methods of using an LCA to modulate patterned light for back-illuminating transparencies are described below.

Viewbox 60 is preferably encased in a casing 72 having light-absorbing inner walls. Thus, ambient light which enters viewbox 60 through display surface 66 is absorbed in the casing and does not reduce the contrast between back-illuminated portions and non-back-illuminated portions of display surface 66.

FIG. 3 is a schematic side view of a preferred embodiment of projection subsystem 62. A light source 80, preferably backed by a concentration reflector 84 generates intense light. The light is converted into a parallel beam of light by condenser optics 86 for back-illuminating an LCA 82. Light transmitted through LCA 82 forms patterned light 81 which is projected by optics 64 onto display 66, as described hereinabove. If LCA 82 has a maximal contrast at an angle other than perpendicular to its face, it is preferably oriented at an angle to the light from condenser optics 86.

Several light modifying elements are preferably placed in the light beam between light source 80 and LCA 82. An infra red (IR) filter 88 reduces the amount of IR in the spectrum of the light, insulating heat-sensitive elements, such as LCAs. A chromatic filter 90, adjusts the spectrum of light source 80, if necessary, to provide the required chromaticity to illuminate the transparency, taking into account:

(a) the transmission spectra of the LCAs;

(b) the emission spectrum of light source 80; and (c) other optical elements in viewbox 60.

Preferably, an integrator 92 serves to smooth the light beam so that it is spatially uniform in intensity. Such an integrator is shown in "Polarization Conversion System LCD projection", cited above. Alternatively or additionally, other optical or diffusing means are used to generate a spatially uniform light beam or to form a non-uniform beam, which is corrected for projection distortions. Alternatively or additionally, the non-uniformity of light source 80 is corrected by concentrator reflector 84, which forms multiple images of light source 80.

LCA 82 is controlled by controller 70 to convert the light beam into patterned light beam 81. LCA 82, in conjunction with a first polarizer 94 and a second polarizer 96 preferably comprise a light valve matrix, which is controllable by controller 70. When a plurality of valves are open in accordance with a pattern, the pattern is imposed on a beam of light passing through LCA 82 to form patterned light 81.

Methods for generating such patterns are shown in the aforementioned PCT publications WO95/14949 and WO95/14950 and in the aforementioned U.S. patent application Ser. No. 08/348,958.

Generally, it is desired to back-illuminate a transparency so that only the display surface behind the transparency is back-illuminated. A dense portion of the transparency is preferably back-illuminated with a higher intensity than other portions of the transparency. Preferably, when two tandem LCAs are used to mask the back-illumination, the LCA closer to the transparency operates in a low-resolution high contrast mode to provide very low light levels outside the transparency or region of interest and the LCA nearer the light source operates in a high-resolution mode to sharply delineate the transparency or regions of interest therein.

Alternatively, the transparency as a whole is viewed using dimmed back-illumination and a region of interest therein is viewed using higher intensity back-illumination. The high-resolution LCA masks the entire display surface and all of the transparency except for the region of interest, and the high contrast LCA masks the entire display surface outside the transparency. As a result, the back-illumination to the region of interest is not masked by any LCA, the back-illumination is masked by only one LCA, so that it is dimly back-illuminated, and the back-illumination to the rest of the display surface is masked by two LCAs, so that it is very dark.

Typically, only one or two transparencies are viewed simultaneously. The inventors have found that a high contrast can be obtained using by driving an LCA using a 2×2 driving scheme, which is appropriate when only one transparency is displayed. In this case, a normally bright LCA is preferably used for the high-contrast LCA. 2×2 and 2×3 driving schemes also provide a high contrast. Such schemes are described in the above incorporated PCT publications and U.S. application.

In the present invention, when LCA 74 is incorporated in viewbox 60, LCA 74 is preferably normally bright and LCA 82 may be either normally bright or normally dark. Either LCA 74 or LCA 82 operates as the high contrast LCA, preferably LCA 82 is high resolution and LCA 84 is high contrast. Preferably, both functions, high-resolution and high-contrast, are accomplished using a single LCA situated near light source 80, as described hereinabove and LCA 74 is omitted.

In the present invention, the contrast of LCA 82 is higher than in most prior art system. Furthermore, the beam-like nature of patterned light beam 81 enhances the effective contrast of LCAs 74 and 82 as opposed to some prior art systems, wherein the back-illumination is partially diffused. As a result, standard passive matrix driving and active matrix driving are also practical for transparency viewing.

Preferably, condenser optics 86 or an additional optical element shape the light beam to have a rectangular cross-section adapted to the aspect ratio of display surface 66.

Light source 80 is preferably a metal-halide lamp, such as a HQI-T 400w blue or a HQI-VG, manufactured by Osram GMbH or a Xenon lamp. Alternatively, other types of light sources, such as mercury vapor and incandescent lamps can be used. However, metal halide lamps have sevejal advantages, especially over fluorescent lamps.

First, the light output of metal-halide or xenon lamps is relatively stable over long periods of time. In addition, the life time of metal-halide lamps is generally long. Second, a wide range of color spectrums are possible with metal-halide lamps, depending on the combination of metals used in the lamp. In some cases, a lamp whose color spectra is generally similar to the color spectra desired for light source 80 can be found or developed and the use of chromatic filter 90 can be avoided. Third, metal-halide lamps are relatively efficient, with up to 50% of their radiant output in the visible wave lengths. Fourth, metal-halide lamps require a smaller ballast per lumen output than fluorescent lamps. Fifth, metal-halide lamps are compact as compared to a fluorescent lamp, making them ideal for projections systems, which generally require a point light source.

A shortcoming of metal-halide lamps is their sensitivity to their input voltage level. Thus, if a stable light output is desired, a voltage-regulated power supply is preferably used to supply voltage to the lamps.

Light source 80 may comprise more than one lamp to achieve higher light intensities or better color spectrums.

It should be appreciated that cooling light source 80, IR filter 88 and projection subsystem 60 in general, is simpler than cooling a direct illumination viewbox of the prior art. In a direct illumination viewbox, the heat is distributed over a large area, which is typically cooled by forced air. In preferred embodiments of the present invention, as described hereinabove, the heat is concentrated in very small portions of viewbox 60, which reach high temperatures. A flume type cooling system is preferably used, in which the heat radiated by light source 80 and IR filter 88 heats surrounding air. The heated air rises through a flume and is replaced by new, cooler air. This is similar to the cooling system used in other projectors.

Figure 1A:
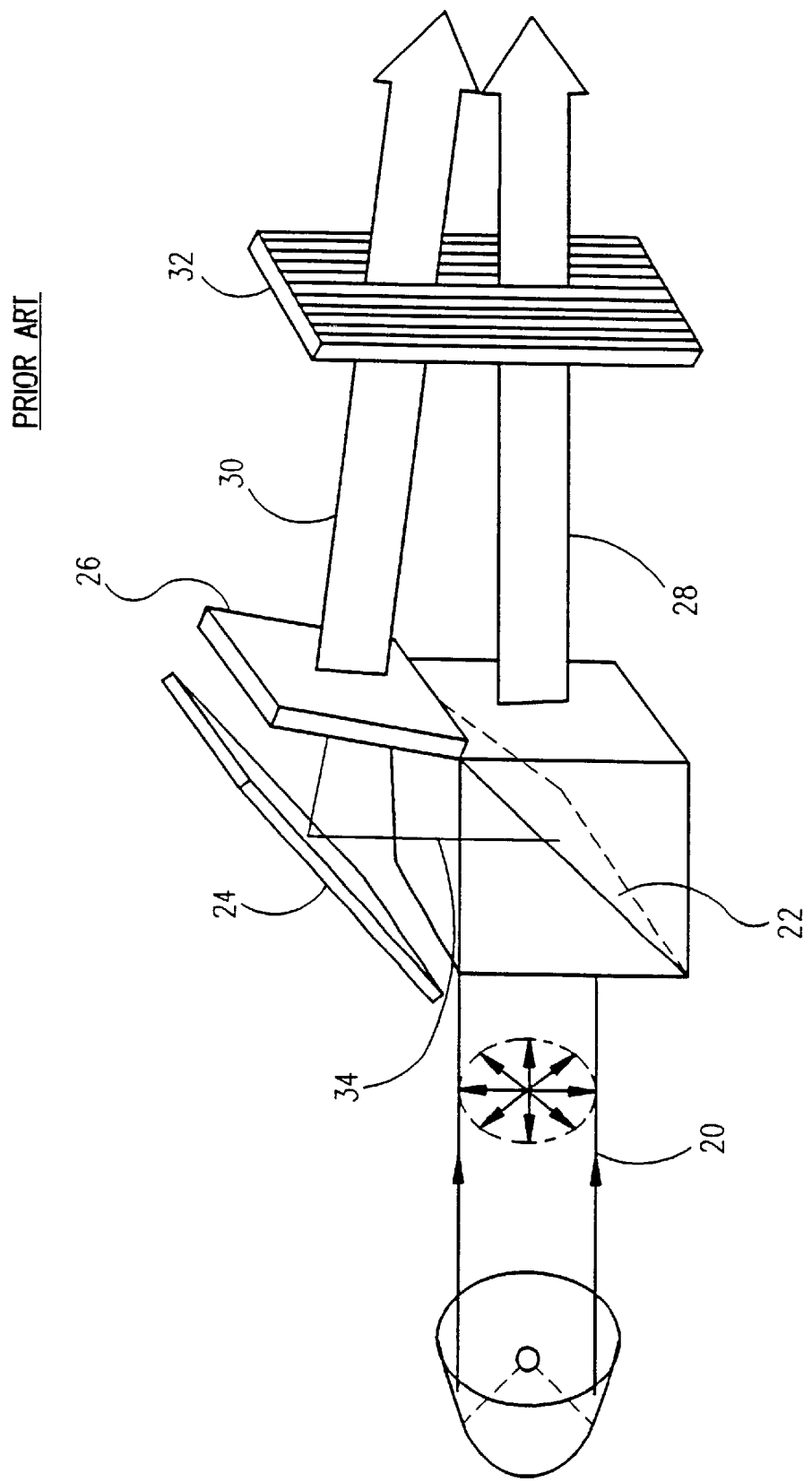
FIG. 1A is an illustration of a first known example of a low-loss polarizer.
Figure 1B:
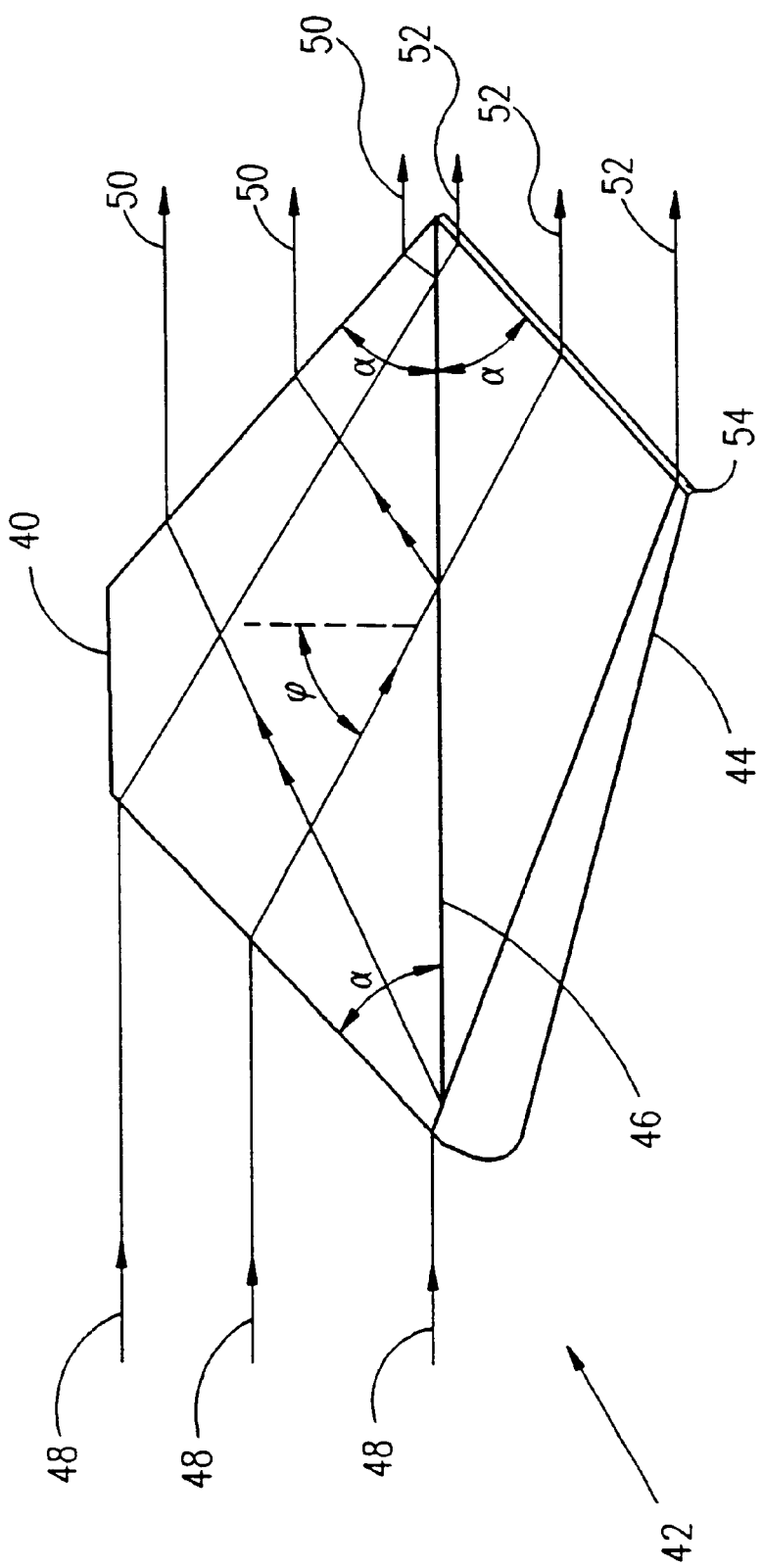
FIG. 1B is an illustration of a second known example of a low-loss polarizer.

In a preferred embodiment of the present invention, polarizer 94 is not a sheet polarizer, since sheet polarizers are relatively inefficient at converting unpolarized light into polarized light. Instead, a low-loss polarizer, such as described above in conjunction with FIGS. 1A or 1B is used for the polarization conversion. Alternatively, polarizer 94 is a retro-reflecting polarizer sheet, such as produced by 3M. A shortcoming of most low-loss polarizers is their wavelength dependence. As a result, light transmitted from a low-loss polarizer is less polarized at some wavelengths compared to others. This unpolarized light can lower the contrast achievable with LCA 82. Accordingly, a linear polarizer is preferably placed between the low-loss polarizer and LCA 82. Thus linear polarizer is a "make sure" polarizer which only affects light which was not converted by the low-loss polarizer.

Since some wavelengths are more polarized than others by low-loss polarizers, the intensity of the polarized light will be wavelength dependent, which will cause a chromaticity error on display surface 66. This chromaticity error is preferably corrected using chromatic filter 90 or by selecting a light source 80 with a precorrected color spectrum.

Chromatic and IR filters, including narrowband rejection and narrowband transmission filters, are described in "Handbook of Optics", volume I, edited by Michael Bass, published by McGraw-Hill Inc., NY.

An important advantage of using a projection subsystem, which projects light from a relatively small LCA, is the commercial availability of relatively inexpensive high-resolution high-contrast LCAs, such as active matrix LCAs. In a preferred embodiment of the invention, the back-illumination is masked using only one LCA, such as a Super Twist Nematic (STN) LCA. For example, model No. G191D manufactured by TECD has a high contrast ratio, a resolution of 192×192 pixels and the ability to display many gray-levels. This type of LCA is generally not available in large sizes, such as 14"×17', which are required by direct back-illumination viewboxes.

In a preferred embodiment of the present invention, light recycling is practiced. Israel Patent application 114,258, titled "Transparency Viewing Apparatus", filed Jun. 21, 1995 and its corresponding U.S. provisional patent application No. 60/001,814, titled "Transparency Viewing Apparatus", to Dan Inbar, filed Aug. 1, 1995 and PCT publication WO95/16934, titled "A Self Masking Display Device", to Dan Inbar, Hannan Wolf and Zvi Neller, published Jun. 22, 1995, the disclosures of which are incorporated herein by reference, disclose methods and apparatus to use light, which would otherwise be lost, to increase the intensity of the back-illumination of illuminated portions of display surface 66. Typically, only a relatively small portion of display surface 66 may be illuminated, for example, when viewing a small transparency on a large viewbox or when viewing a small area of interest on a relatively large transparency. As a result, even if the efficiency of the recycling is low, such as 20%, the intensity increase over the viewed area can be high.

Figure 4A:
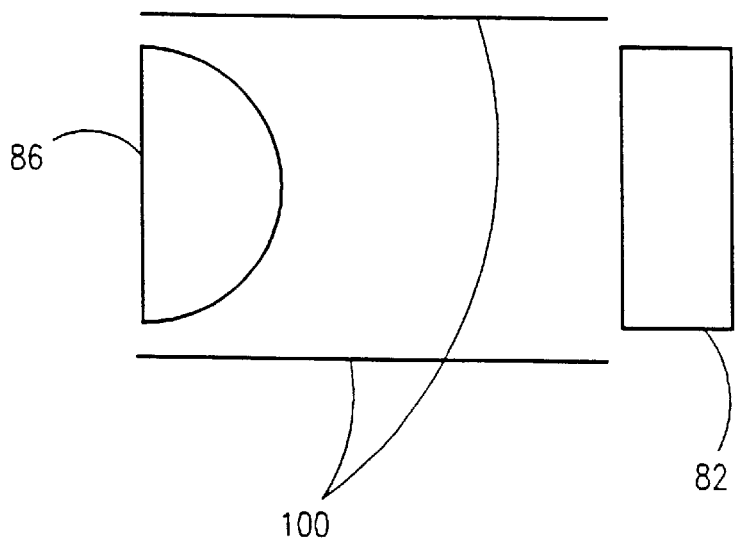
FIGS. 4A and 4B are illustrations of light recycling systems according to preferred embodiments of the present invention.
Figure 4B:
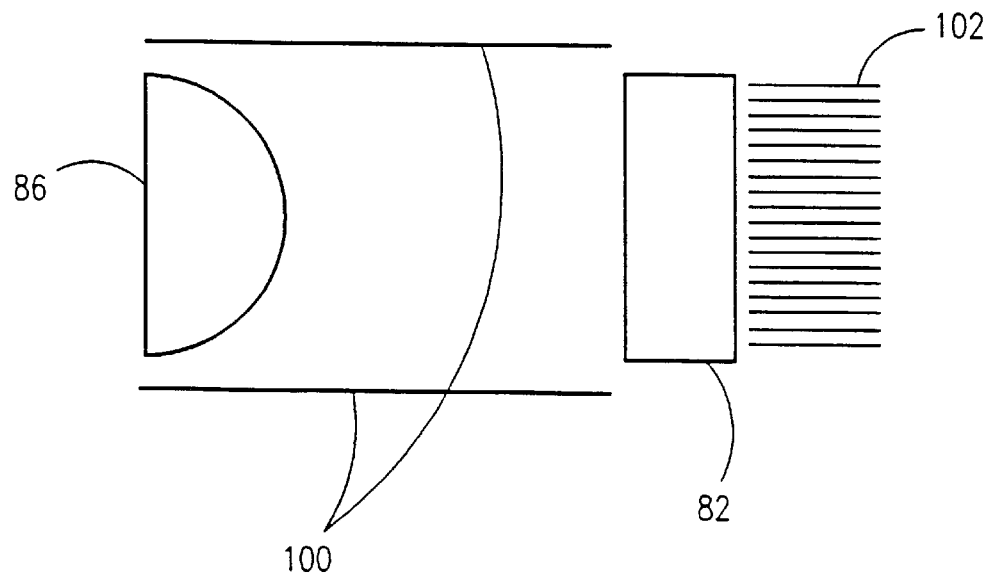

FIGS. 4A and 4B are illustrations of light recycling systems according to preferred embodiments of the invention. FIG. 4A shows only condenser optics 86 and LCA 82 (from FIG. 3). Light reflected from LCA 82 is recycled by a plurality of reflectors 100 which reflect the light back towards LCA 82 or toward condenser optics 86. Alternatively or additionally, scattered light is recycled by a reflector, such as reflector 84 (shown in FIG. 3). Additionally or alternatively, projector 62 is encased in a casing having light reflecting inner surfaces to enhance light recycling.

In a preferred embodiment of the present invention, LCA 82 is a Polymer Dispersed Liquid Crystal Array (PDLCA), which selectably either transmits or scatters light in all directions. A PDLCA modulates both polarized and non-polarized light, so polarizer 94 and polarizer 96 are not required. A PDLCA is especially suitable for light recycling since very little light is absorbed by the LCA itself, most of the non-transmitted light is scattered, and as such can be collected and recycled.

In a projector using a PDLCA, a large amount of untransmitted light is scattered back to reflectors 100. Light reflected from reflectors 100 and light scattered forward from LCA 82 may be non-parallel to patterned light 81. As a result, the non-parallel light may be projected on portions of display surface 66 which are meant to be dark. FIG. 4B shows another preferred embodiment of the invention, in which a collimator 102 is placed on the exit face of LCA 82 to prevent scattered light, which passes through LCA 82, from lowering the contrast in patterned light 81.

Alternatively or additionally, light reflecting shutters are position between LCA 82 and light source 80 to reflect light from masked portions of display surface 66 back toward back-reflector 84. The positioning of the shutters is preferably controlled by controller 70 to overlap darkened portions of LCA 82, but may also be manually controlled.

In some known systems which use more than one LCA to modulate light for back-illumination, grid patterns are formed by light passing through the non-active spacings between LCA elements and are eliminated by a diffuser placed between the LCAs. In a preferred embodiment of the present invention, no diffuser is used. Instead, grid patterns and other aberrations formed in the pattern of light beam 81 are softened by the long distance between LCA 82 and display surface 66. This softening is achieved by the existence of slight aberrations in the optical lens and in LCA 82, which are amplified by the distance that patterned beam 81 transverses. Alternatively, backprojector 60 uses out of focus optics to soften the pattern of light beam 81, while preserving a spatial resolution of approximately 3 to 10 mm.

It should be appreciated that patterns caused by non-active portions of active matrix LCAs are also corrected by the abovedescribed methods of beam softening.

Figure 5:
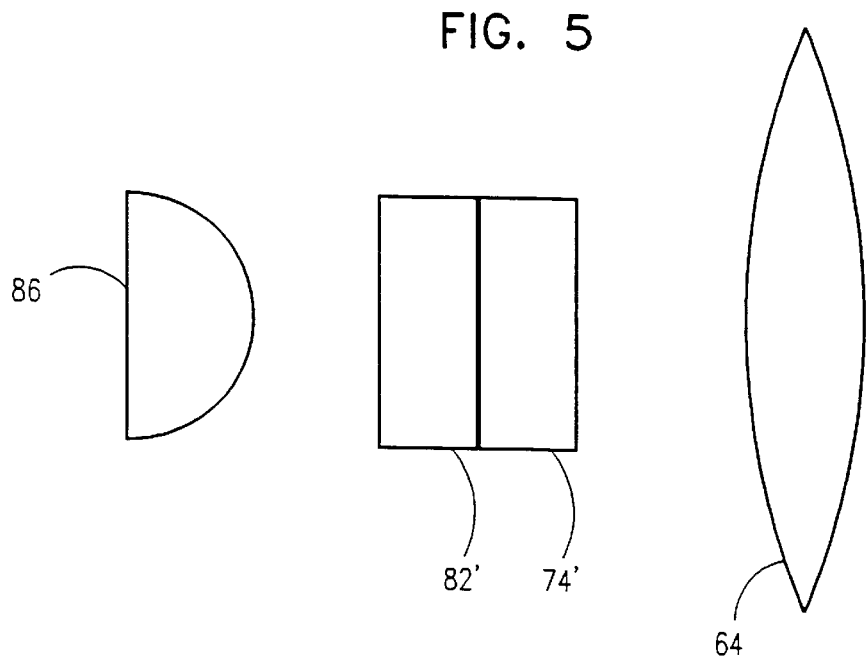
FIG. 5 is a schematic illustration of a projection subsystem for a viewbox according to a preferred embodiment of the invention having two LCAs.

FIGS. 2 and 3 show an embodiment of the present invention wherein one LCA (82) forms part of projection subsystem 62 and another LCA (74) is located near display surface 66. FIG. 5 is a schematic illustration of a portion of a projection subsystem of a viewbox having an LCA 82' and an LCA 74'. Preferably, LCA 82' and LCA 74' have substantially no gap therebetween. An advantage of having both LCA 82' and LCA 74' in the projection subsystem is their lower sensitivity to misalignment. In addition, the distance between LCA 74' and display surface 66, has a softening effect on beam 81, which eliminates patterns caused by LCA 74', as described above.

Yet another advantage resulting from distancing display surface 66 from LCA 82 is the enlargement of the viewing angle. In some systems which use LCAs to mask back-illumination, the viewing angle is limited by the effective masking angle of the LCAs used. Thus, as the angle between a viewer and the normal to the LCA surface is increased, the contrast between back-illuminated portions or the display surface and non-back-illuminated portions is reduced. In contrast, preferred embodiments of the present invention have a much wider viewing angle due to their geometry and the type of LCA used. In addition, some known systems use a BEF (Brigh-cness Enhancement Film, to direct the back-illumination so that it is substantially perpendicular to the LCAs. As described herein, A BEF is generally not needed in the present invention, since the back-illumination is converted into a parallel beam by condenser optics 86. Thus, beam 81 is substantially perpendicular to LCA 82 when it passes therethrough, but not perpendicular to display surface 66, as a result of projection by optics 64.

Alternatively or additionally, display surface 66 is a lecticular screen, as described in "Projection Displays", cited above, which intensifies the illumination in a narrow range of viewing angles. This gives brighter back-illuminating over a narrower viewing angle.

One problem with projectors is that the center of the display surface is closer to the light source than the edges of the display surface. Thus, there usually is a significant luminosity difference between the center of the display surface and its edges. In a preferred embodiment of the invention, a neutral density filter (not shown) is placed between condenser optics 86 and projection optics 64 to attenuate patterned beam 81 in a manner which corrects the luminance differences. Alternatively or additionally, controller 70 drives LCA 82 and/or LCA 74' using a pattern which corrects for the luminosity differences.

Preferably, the luminosity differences are determined during a calibration process during which the surface of viewbox 60 is imaged in one or more back-illumination states. Alternatively, the luminosity differences are determined analytically and an appropriate filter produced. If the luminosity differences also include color differences, chromatic filter 90 corrects these color differences.

In order to achieve automatic operation of viewbox 60, such as automatic luminance correction and automatic masking of transparencies, a preferred embodiment of the present invention preferably uses an imaging camera or an optical sensor to image display surface 66. Aforementioned U.S. application Ser. No. 08/348,958, the aforementioned PCT publications WO91/10152, WO95/14949, and WO95/16934, Israel patent application 113,623, titled "Advanced Viewing Device", filed May 5, 1995, a U.S. provisional patent application No. 60/001,816, titled "Improved Display Device", filed Aug. 1, 1995, to Dan Inbar, Alex Natanzon, Hanan Wolf, Ben Zion Levy and Eran Shaffir, Israel application 113,418, titled "Determination of Position of Transparency" or "Transparency Position Determination", filed Apr. 18, 1995 and a U.S. provisional patent application No. 60/001,811, titled "Transparency Position Determination", by Dan Inbar, Eran Shaffir, Hanan Wolf and Alex Natanzon, filed Aug. 1, 1995, the disclosures of which are incorporated herein by reference, disclose apparatus and methods for imaging a display surface of a viewbox with transparencies thereon and acting on the acquired data. Alternative automatic masking methods are described in Israel application 113,624, titled "Automatic Transparency Masking", filed May 5, 1995 and a like titled U.S. provisional patent application No. 60/001,819, to Dan Inbar, Hanan Wolf, Giora Teltsch and Eran Shaffir, filed Aug. 1, 1995, the disclosures of which are incorporated herein-by reference.

Figure 6:
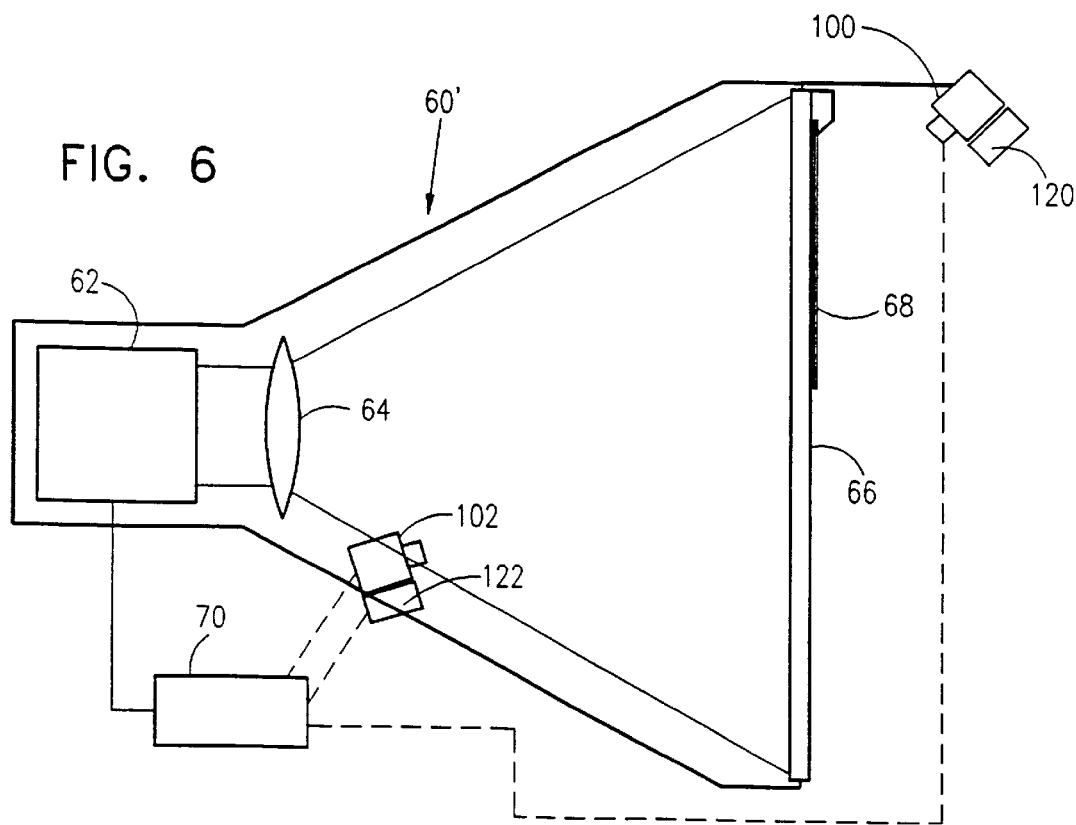
FIG. 6 shows two preferred locations for a camera which images transparencies placed on the viewbox according to a preferred embodiment of the present invention.

FIG. 6 shows two preferred locations for a camera according to two preferred embodiments of the present invention. In a first preferred embodiment a camera 100 is placed outside a viewbox 60', such that camera 100 can view display surface 66 in an unobstructed manner. Typically, display surface 66 is dark when no transparency is mounted thereon. Preferably, display surface 66 is continuously or momentarily illuminated by an IR light source when a new transparency 68 is placed thereon, so that camera 100 can view transparency 68. Preferably, the IR light source is mounted on camera 100 to point at display surface 66. Alternatively, display surface 66, or a portion thereof, is momentarily back-illuminated at a low, non-dazzling, light level.

Alternatively or additionally, in a second preferred embodiment of the present invention, a camera 102 is placed inside viewbox 60', such that it view display surface 66 from the inside. Transparency 68 is back-illuminated by ambient light, so that its location on display surface 66 is visible, especially when viewbox 60' has no LCA between camera 102 and display surface 66. Preferably, display 66 is coated on the inside with a non-reflective coating to enhance the visibility of the ambient light. Alternatively or additionally, camera 102 is fitted with a spectral IR filter so that camera 102 only images IR light from an external (to viewbox 60) IR light source. Preferably, a non-directional ambient light source (not shown) supplies the IR illumination.

Alternatively, spectral gaps in the spectra of light source 80 (shown in FIG. 3) are exploited by camera 102. A narrowband transmission filter, fitted on camera 102, rejects illumination arriving internally from system 60. Typically, the ambient illumination entering display surface 66 from outside viewbox 60 has sufficient intensity in the spectral gaps for imaging purposes. Alternatively, illumination in the spectral gaps is supplied by a special external light source outside viewbox 60.

Alternatively or additionally, temporal gaps in the illumination by light source 80 are utilized for imaging purposes by camera 102. Typically, the intensity of illumination from light source 80 varies as a function of the voltage supplied to light source 80. Camera 102 and the voltage supply are synchronized such that camera 102 acquires images of display surface 66 while light source 80 is temporarily dimmed for a very short period, i.e., several milliseconds.

Figure 7:
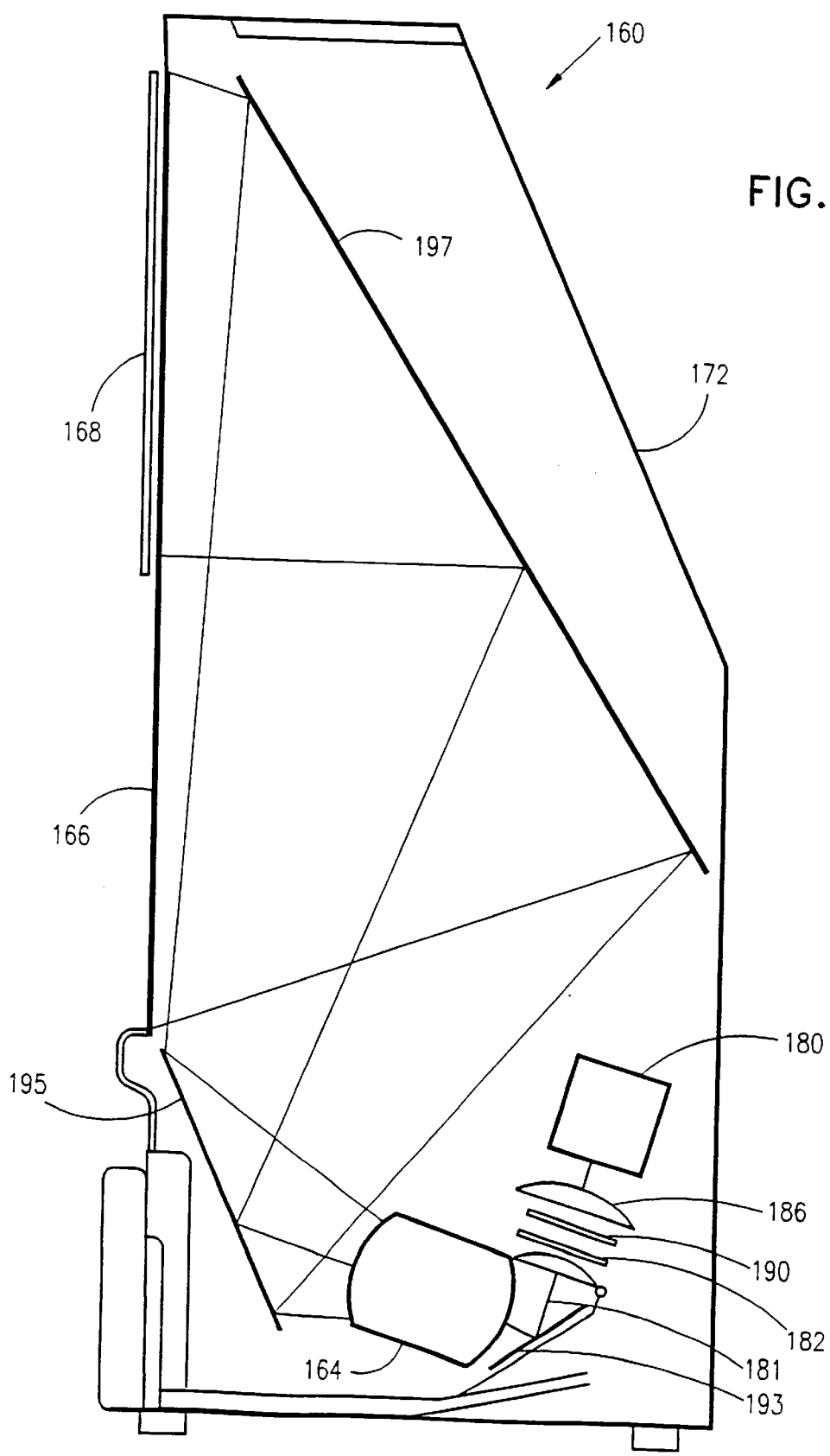
FIG. 7 shows a viewbox according to a preferred embodiment of the invention having a folded optical path.

FIG. 7 is a simplified schematic of viewbox 160 having a folded optical path, according to a preferred embodiment of the invention. The structure of viewbox 160 is generally similar to that of viewbox 60 shown in FIGS. 2 and 3. Condenser optics 186 converts light from a light source 180 into a parallel light beam. The color spectrum of the light beam is preferably corrected using a color correction filter 190 before or after the beam passes through an LCA 182 to form a patterned beam 181. Beam 181 is reflected off a first mirror 193 and projected by projection optics 164 towards a second mirror 195. Beam 181 is then reflected towards a third mirror 197, which reflects beam 181 to back-illuminate a display surface 166 having a transparency 168 mounted thereon. Viewbox 160 is encased in a light-proof and light absorbing casing 172, excepting display surface 166. Preferably, a cooling system (not shown) cools the lower part of viewbox 160, which contains the heat producing elements. Alternatively, a flume cooling system as described hereinabove is used to cool viewbox 160.

An important advantage of using a folded optical path is that a large screen can be back-illuminated with its entire projector contained a relatively thin viewbox, which does not take up a large amount of space.

Figure 8:
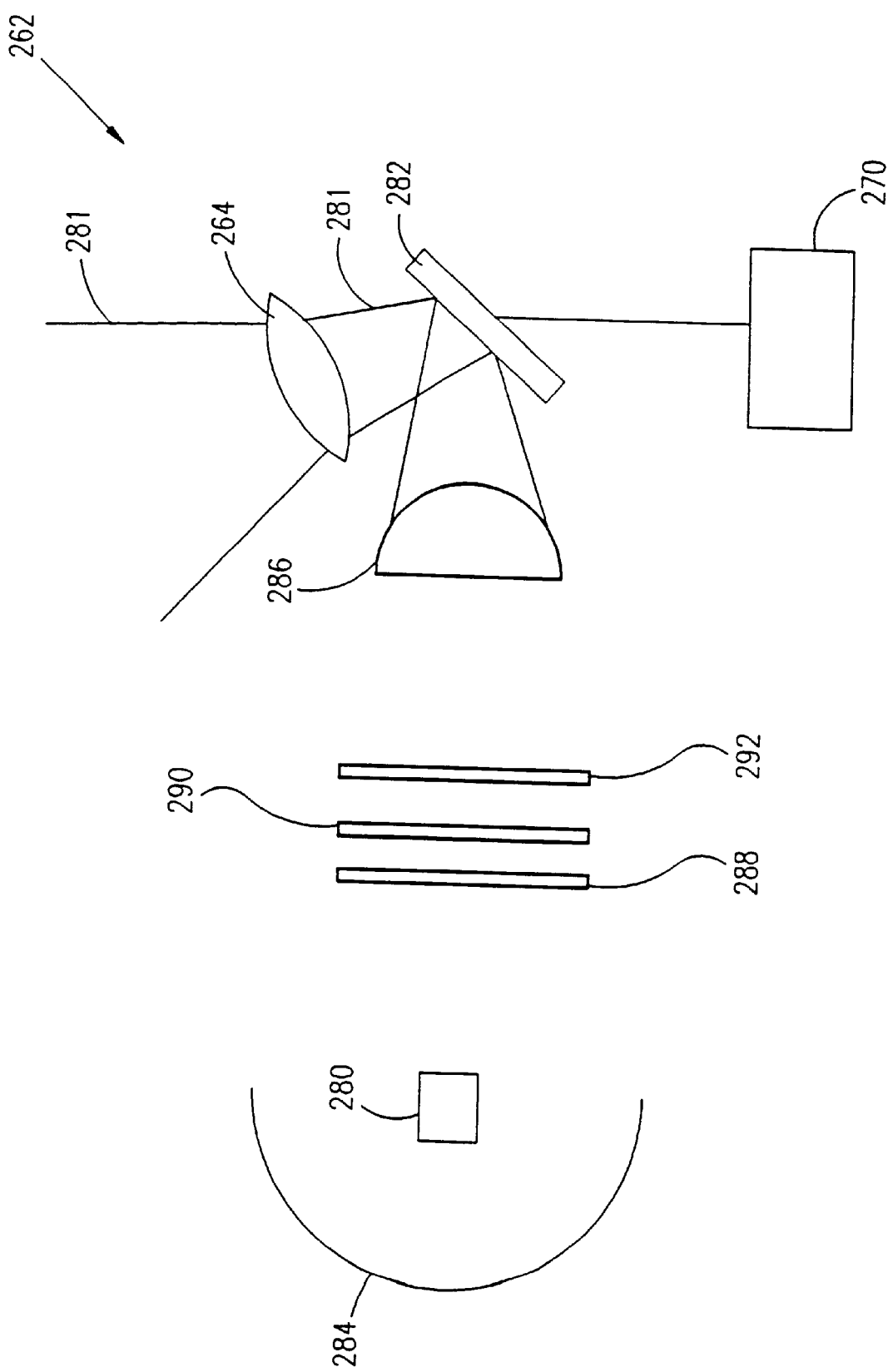
FIG. 8 shows a projection subsystem based on a DMD (digital micro-mirror device) according to another preferred embodiment of the present invention, suitable for the viewbox of FIG. 2.

FIG. 8 show a preferred embodiment of a projection subsystem 262 which is based on a DMD (digital Micromirror device) 282. Light from a light source 280, which is preferably concentrated using a backreflector 284, is formed into a cone beam by condenser optics 286. The cone beam is reflected off DMD 282 to form a patterned beam 281. Projection optics 264 projects patterned beam 281 toward a display surface, such as display surface 66 (shown in FIG. 2). An IR filter 288, a chromatic filter 290 and an integrator 292 are preferably located in the light path between light source 280 and condenser optics 286, as described hereinabove with reference to FIG. 3.

DMD 282 is a solid state mirror device which is controlled by a controller 270 to reflect an incident cone beam to form the patterned beam 281. Portions of the cone beam which are not reflected into beam 281 are typically reflected in a different direction. Preferably, a mirroring apparatus (not shown) collects and recycles the unused light from the cone beam and reflects it toward back-reflector 284.

DMDs and projectors incorporating DMDs are described in "The Design of High-Efficiency High-Resolution Projectors with the Digital Micromirror Device", by H. C. Burstyn, D. Meyerhofer and P. M. Heyman and in "An Overview of the Performance Envelope of Digital-Micromirror-Device-Based Projection Display Systems", by J. B. Sampsell, both of which are published in the Digest of Technical Papers of the 1994 SID international symposium by the Society for Information Display, California and are incorporated herein by reference.

It should be appreciated that more efficient control of DMD 282 can be realized in an embodiment of the present invention as opposed to some known DMD image projectors. In most DMD projectors a design goal is the display of fast changing images. Thus, the micro-mirrors which comprise the DMD are constantly in motion and while in motion do not contribute to image intensity. In an embodiment of the present invention, the micro-mirrors are substantially static, and so, back-illumination is more intense.

In general, when using a back-projector, as in the present invention, the display surface size is mainly limited by the intensity of the light source and not by the price of the imaging components, whose size is not strongly dependent on the display size.

In a preferred embodiment of the present invention, shown in FIG. 6, the intensity and/or color of the back-illumination is sensed by a light sensor 120, preferably located outside viewbox 60, such as adjacent camera 100. Alternatively or additionally, a light sensor 122 is located inside viewbox 60', such as adjacent camera 102. Controller 70 controls the intensity of the back-illumination to compensate for variations in the intensity with time due, inter alia, to light recycling, warm-up of light source 80 or aging of light source 80. The intensity and/or color of the back-illumination are preferably controlled by changing the voltage of light source 80, by turning lamps in light source 80 on or off or by changing the density of the pattern used to drive LCA 82. Alternatively, non-optimal back-illumination conditions are reported to the operator.

It should be appreciated that other projectors known in the art can be used instead of an LCA projector. For example, an oil-film projector and a photo-electric projector. In addition other types of light-valves may be used instead of LCA or mirror light-valves, for example, mechanical shutters, ferro-electric light valves, reflection light valves such as photo-electric light valves, and other types of light valves.

It will be appreciated by a person skilled in the art that the invention is not limited by what has been described hereinabove. Rather, the scope of the invention is only limited by the claims which follow.

What is claimed is:

1. A method of transparency viewing comprising:
   placing a transparency at a viewing surface;
   forming a non-uniform light pattern; and
   projecting the non-uniform light pattern to back illuminate the viewing surface therewith.

2. A method according to claim 1, wherein forming a light pattern comprises spatially modulating a beam of light using a plurality of light-valves to produce said light pattern.

3. A method according to claim 2 wherein projecting the light pattern comprises further spatially modulating the projected light with a plurality of light-valves.

4. A method according to claim 2 where said pattern comprises dark portions and bright portions and wherein said spatial modulating comprises redirecting at least a portion of said beam of light from dark portions of said pattern to bright portions of said pattern.

5. A method according to claim 4, wherein said redirecting comprises:
   scattering a portion said beam from said plurality of light-valves; and
   redirecting said scattered portion back toward said light valves.

6. A method according to claim 4 or claim 5 wherein said modulating comprises:
   reflecting a portion of said beam of light from said dark portions of said pattern to a third location; and
   reflecting at least some of said portion of said beam of light from said third location toward said plurality of light valves.

7. A method according to any of claims 2–5, wherein said spatially modulating comprises spatially modulating said beam of light to correct for intensity variations caused by said projection.

8. A method according to any of claims 2–5, wherein said spatially modulating comprises converting a polarization of said beam of light using a low-loss polarizer.

9. A method according to any of claims 2–5, wherein said spatially modulating comprises reflecting said light off a plurality of reflectance type light valves.

10. A method according to any of claims 2–5, wherein said spatially modulating comprises driving each of said plurality of light valves in an independent manner.

11. A method according to any of claims 2–5 wherein said spatially modulating comprises modulating said beam of light using an LCA (Liquid Crystal Array).

12. A method according to any of claims 1–5 wherein said projection comprises out-of-focus projection of said pattern toward said viewing surface.

13. A method according to any of claims 1–5 wherein the light pattern comprises at least three distinct portions of different brightnesses.

14. A viewing box comprising:
   a display surface adapted for mounting a transparency thereon;
   a light modulator which modulates light to form a non-uniform light pattern on the display surface; and
   a projector which back projects the non-uniform light pattern onto the display surface.

15. A viewbox according to claim 14, wherein said light modulator comprises a plurality of light valves which modulate said light.

16. A viewbox according to claim 15, further comprising a face light valve located adjacent to the viewing surface.

17. A viewbox according to claim 15, wherein said plurality of light valves in said light modulator backscatter light from masked portions thereof.

18. A viewbox according to claim 17, further comprising means for redirecting light scattered by said plurality of light valves back toward said plurality of light valves.

19. A viewbox according to claim 17, further comprising a reflecting surface which redirects light scattered by said plurality of light valves back toward said plurality of light valves.

20. A viewbox according to any of claims 15–19, wherein said light modulator further comprises a collimator adjacent said plurality of light-valves which collimates light diffused by said plurality of light-valves.

21. A viewbox according to claim 20 wherein the collimator is downstream from said plurality of light valves.

22. A viewbox according to any of claims 15–19, wherein said modulated light pattern comprises dark portions and bright portions and further comprising a light recycling apparatus which blocks light from passing through said plurality of light-valves at locations corresponding to said dark portions and redirects said blocked light to portions of said plurality of light-valves which correspond to said bright portions.

23. A viewbox according to claim 22, wherein said light recycling apparatus comprises light reflecting shutters selectably positionable adjacent said plurality of light-valves.

24. A viewbox according to any of claims 15–19, wherein said projector comprises a second plurality of light-valves arranged in tandem with said plurality of light-valves.

25. A viewbox according to any of claims 15–19, wherein said projector further comprises:
   a light source; and
   an infra red filter situated between said light source and said plurality of light-valves comprised in the projector.

26. A viewbox according to any of claims 15–19, wherein said plurality of light-valves comprises a liquid crystal array (LCA).

27. A viewbox according to claim 26, wherein said LCA comprises a super twisted nematic LCA.

28. A viewbox according to claim 26, wherein said LCA comprises a polymeric dispersion liquid crystal array.

29. A viewbox according to claim 26, wherein said LCA comprises an active matrix LCA.

30. A viewbox according to claim 26, wherein said plurality of light-valves comprises a low-loss polarizer which polarizes light entering said plurality of light-valves.

31. A viewbox according to claim 30, further comprising a second polarizer for polarizing light entering said plurality of light-valves.

32. A viewbox according to claim 30, wherein said low-loss polarizer comprises a retro-reflector sheet polarizer.

33. A viewbox according to any of claims 14–19, wherein said light modulator comprises a mechanical shutter system which modulates said back-illumination.

34. A viewbox according to any of claims 15–19, wherein said plurality of light-valves comprises a plurality of reflectance type light-valves.

35. A viewbox according to claim 34, wherein said plurality of reflectance type light-valves comprises a digital micro-mirror device.

36. A viewbox according to any of claims 14–19, further comprising means for recycling light.

37. A viewbox according to any of claims 14–19, further comprising a neutral density filter which corrects intensity non-uniformities on said display surface.

38. A viewbox according to any of claims 14–19, further comprising a chromatic filter which adjusts the color spectrum of the light back-illuminating said transparency.

39. A viewbox according to any of claims 14–19, wherein said display surface comprises a diffuser.

40. A viewbox according to any of claims 14–19 further comprising a mirror which reflects said light pattern towards said display surface.

41. A viewbox comprising:
   a display surface adapted for mounting a transparency thereon;
   a light modulator which modulates light to form a non-uniform masking pattern, comprising:
      a plurality of light valves; and
      a low-loss polarizer which polarizes light entering said plurality of light valves; and
   a projector which projects the non-uniform masking pattern onto the display surface to back illuminate the masking surface with the projected non-uniform masking pattern.

42. A viewing device according to claim 41, wherein the light valves are disposed between the projector and the display surface.

43. A viewbox according to claim 41 or claim 42, wherein said plurality of light-valves comprises a low-loss polarizer which polarizes light entering said plurality of light-valves.

44. A viewbox according to any of claims 14–19 or 41, further comprising a camera which views said display surface.

45. A viewbox according to claim 44, wherein said camera is located inside said viewbox.

46. A method according to claim 1 wherein the formed non-uniform light pattern is substantially smaller than the viewing surface.

47. Apparatus according to claim 14 wherein the light modulator is substantially smaller than the display surface.

48. Apparatus according to claim 41 wherein the light modulator is substantially smaller than the display surface.

* * * * *